United States Patent Office 2,797,295
Patented June 25, 1957

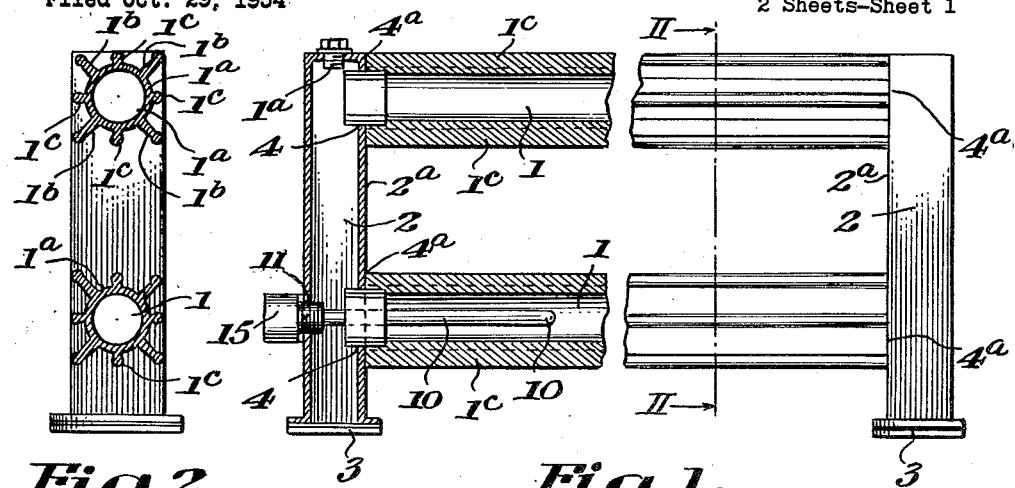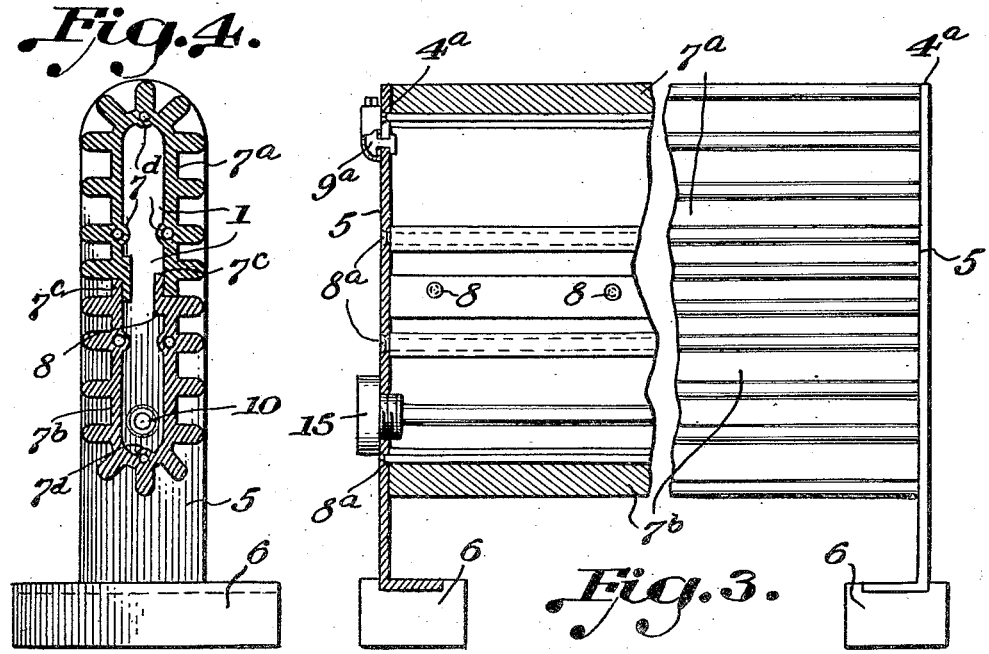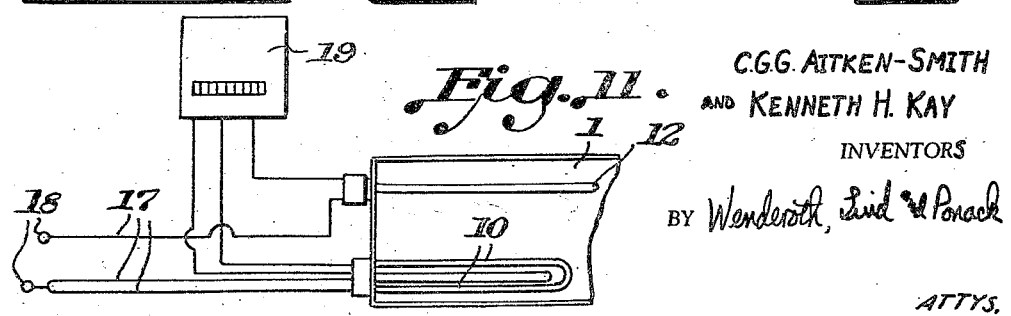

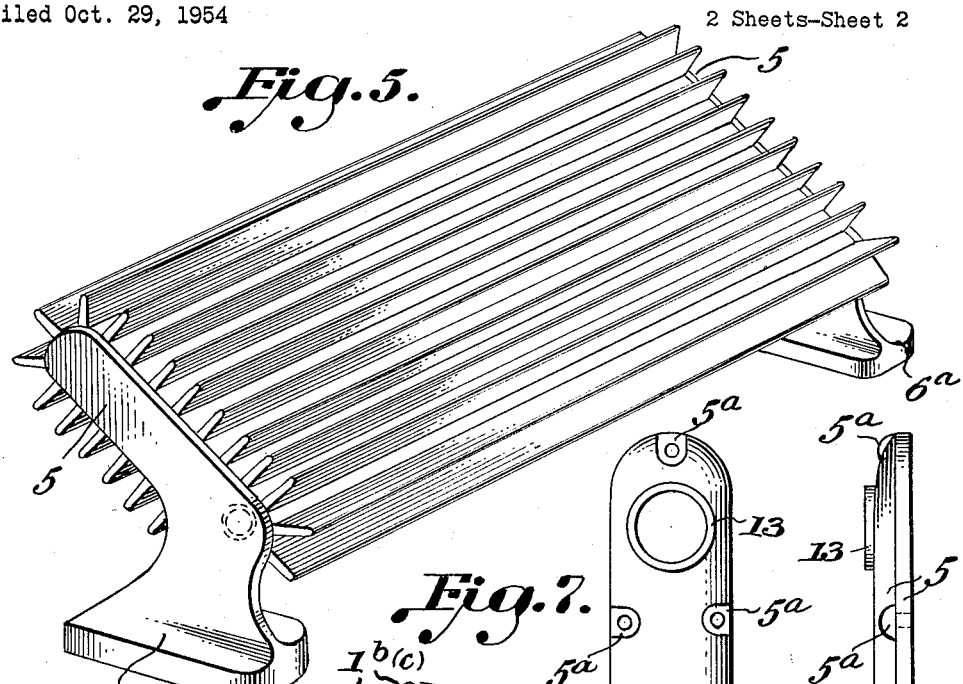
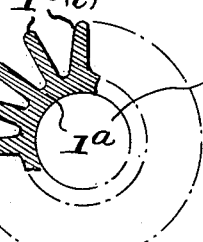
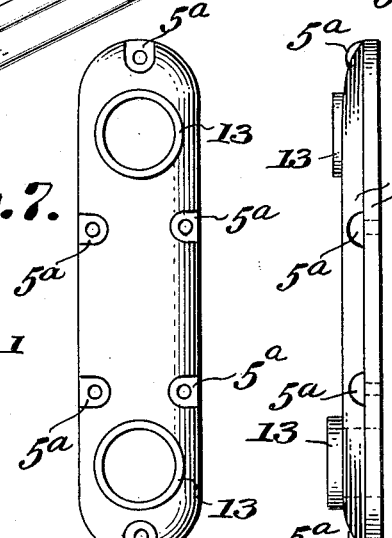
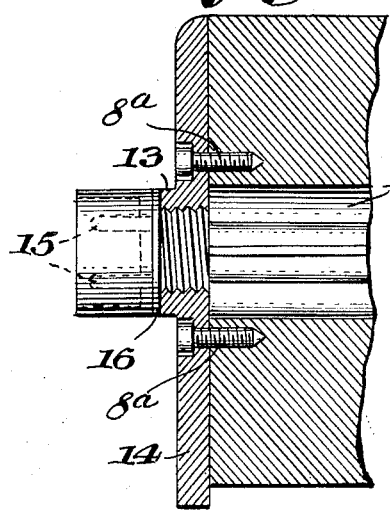
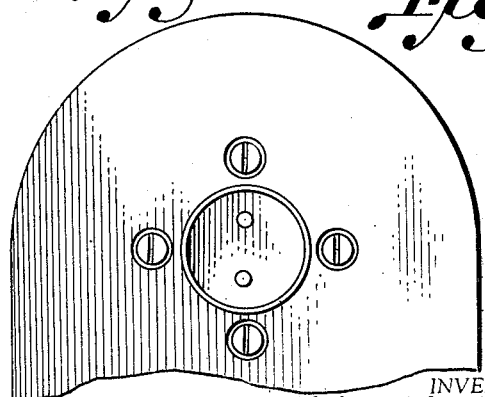

2,797,295

ELECTRIC HEATING APPLIANCES

Charles Geoffrey George Aitken-Smith and Kenneth Herbert Kay, Durban, Union of South Africa Application October 29, 1954, Serial No. 465,636

Claims priority, application Union of South Africa November 6, 1953

11 Claims. (Cl. 219—38)

This invention relates to electric heating appliances and provides a general-purpose heater suitable for industrial or domestic use as an alternative to ordinary central-heating apparatus and which, while operating on the like conductive-heating principle with its concomitant avoidance of drying out the air about the heating appliance, and safety by the elimination of "hot spots" and/or risks of burning or fire arising from personal or material contact therewith, presents advantages over such known apparatus in avoiding high initial installation, maintenance and running costs, in dispensing with furnaces and attendant piping, providing lightness and mobility of the heater and flexibility as to its size and heating capacity, and in providing for thermostatic operating temperature control in a simple way.

According to the invention, a heater comprises a generally tubular chamber or series of interconnected substantially parallel tubular chambers defined by the interior surfaces of one or more externally finned extruded section or similar heat-conductive hollow metal bodies, which chamber or interconnected chambers is/are devised to contain a heat-conductive fluid, and, in heat-exchange relationship with the fluid, one or more sealed electric immersion heating elements.

More particularly, the heater may be arranged in relatively flat generally panel form suitable for erection and support in any upright or other position or inclination with the chamber or chambers extending preferably substantially horizontally and the element/s extending along preferably the lower part of the chamber or the lowermost of the interconnected chambers.

Preferably, the hollow bodies above referred to are relatively thin-walled extrusions in aluminum alloy or similar material with longitudinally continuous ribs liberally provided on the exterior both strengthening the walls and serving as heat-radiating fins.

Where parallel or other separate tubular chambers are provided their corresponding ends connect respectively with suitable hollow oblong or other section header bodies by which they are mechanically connected in fluid-tight fashion and which interconnect the respective chambers for the fluid; such headers or either of them also serving to admit the heating element/s and support it/them in the selected, e. g. the intended lowermost chamber.

Where only a single chamber is provided, its opposite ends are closed in fluid-tight fashion by simple end plates; through and by either of which the heating element/s is/are admitted and supported, preferably to extend along the intended bottom of the chamber.

Referring now to the accompanying drawings, which illustrate various ways of carrying this invention into effect:

Figure 1 is a part-sectional front elevation (shown broken in length) of one construction comprising a pair of parallel tubular chambers;

Figure 2 is a cross-section as indicated by arrows II—II in Figure 1;

Figures 3 and 4 are views corresponding with Figures 1 and 2 but showing a single-chamber portable construction;

Figure 5 is a perspective view of a modified version of the construction shown in Figures 3 and 4;

Figure 6 is a fragmentary and incomplete cross-section through a chamber, illustrating a suitable extrudable radiating vane arrangement applicable more especially to tubular chambers intended for connection at their ends in a heater of the kind shown in Figures 1 and 2;

Figures 7 and 8 are outside and edge elevations respectively of a convenient construction of end plate for single-chamber constructions such as those shown in Figures 3, 4 and 5;

Figures 9 and 10 respectively are a fragmentary longitudinal section and an outside end view showing how a heating element or the like (e. g. a thermostat element) may be entered and sealed into a chamber end; and Figure 11 is a diagrammatic view of a circuitry and equipment suitable for the operation and control of a heater of the kind the main subject of this invention.

In Figures 1 and 2, two separate tubular chambers 1, 1 (of any desired length and cross-sectional area) extend in parallelism between the two end headers 2, 2 of the box section shown, having fluid-tight closures at 3, 3 such as may serve as feet for supporting the complete heater. The convenient extruded section for separate chambers intended to be end-connected as in Figures 1 and 2 is such as provides a cylindrical wall 1a with four similar deep radial fins 1b reaching to the corners of an imaginary square concentric with the wall, and four similar, shallow fins 1c alternating evenly with the deeper fins to reach only the sides of such square. The ends of the chambers 1 are conveniently sleeve-connected as at 4 into and sealed suitably at 4a against the adjacent walls 2a of the header bodies, whereof (as apparent from Figure 2) the width may equal the length of side of the aforementioned imaginary square.

A more or less standard section of regularly finned extruded chamber tubing, such as that shown in Figure 6, may if desired be substituted for the section shown in Figures 1 and 2.

Referring now to Figures 3 and 4, the heater comprises a single tubular chamber 1 of a generally flat panel form and of the desired length and cross-sectional area, having its opposite, squared, ends sealed at 4a to the end plates 5, 5, whereof supporting feet formations are provided as shown at 6. Such a single-chambered construction comprises, for ease of manufacture using extrusion methods, a pair of identical deep trough- or U-section thin-walled, externally longitudinally ribbed or finned bodies 7a and 7b as shown, suitably assembled by mating the free edges 7c of their side walls as in continuous marginal flange surfaces and fixing these together in fluid-tight joints as by distributed set screws 8 or the like. The end closure plates 5 are more clearly shown in Figures 7 and 8 and are attached and sealed to the chamber assembly 7a, 7b by suitably distributed set screws 8a or the like (see also Figure 9) entering suitably thickened bosses 7d, defined in the extrusion of the chamber walls, via bosses as 5a formed on the end plates.

In either of the above-described and illustrated types of construction, the intended top end of either end header, or the intended top end of either end plate may have a suitable filler plug fitted, as at 9a, through which the heater may be charged with the required fluid; and the lower ends, or extensions, of the headers or end plates may be provided with any suitably constructed feet or the like for standing the heater in any desired position and/or for fixing it to a floor or the like when mobility is not required; and Figure 5 which is essentially a construction of mobile heater as described with reference to Figures 3 and 4 shows an example wherein the end plate members 5 are cast to a smooth and pleasing shape integrally with feet 6a adapted to support the heater in the rearwardly inclined position shown.

Adverting more particularly to Figures 1 to 4 and 9, and referring additionally to Figure 11, the heater element is an immersion element 10, preferably a "two-heat" element, entered longitudinally into the lowermost chamber, or into the lower part of the single chamber, through a suitable fluid seal at 11 in either header 2 or either end plate 5, as the case may be, and where a thermostatic control is to be included in the installation the element 12 thereof may be inserted in a like fashion to the heating element but into the upper part of the heating fluid space or chamber (see more especially Figure 11). Screwed boss formations as at 13 represent a type of admission means suitable for heating and thermostat elements, in which connection the boss-carrying end part shown in Figures 9 and 10 may be regarded either as the outside wall of an end header as in Figures 1 and 2, or as an end plate as in Figures 3 and 4; and pins 15 represent suitable electrical connection points to the respective elements entered through and supported and sealed (as by washer 16) in operative position in the heater chamber.

In the diagrammatic Figure 11, the electric circuitry may comprise the lines 17 forming a network of a generally-known kind from supply points 18 to the two-heat and thermostat elements 10 and 12 and with a pre-set air-temperature control unit 19 installed at any suitably selected region in the room or the like in which the heater is installed.

Preferably, the aluminum alloy or like parts are anodised or otherwise similarly treated for rust- and corrosion-prevention and if desired dyed to obtain any desired matching with colour schemes.

Heaters according to this invention are readily made up to any size and capacity whether by extension or diminution of the length (as represented by the chamber length) the number and/or cross-section of the hollow bodies, or by the introduction or removal of sections interconnectable laterally and/or longitudinally in arrangements conforming substantially with the foregoing descriptions.

Any fluid, more especially liquids, may be used for charging the heaters, such as effectively conduct and distribute heat from relatively low-wattage elements to the chamber walls for transmission to the ambient air via the extended surface area of the heaters; and it is intended ordinarily that the latter shall be operated at sub-boiling temperatures.

Basically such liquids may be water solutions which may be composed as follows: (a) 1 gallon water, 60 grammes powdered glue, 6½ lbs. sodium nitrate, or (b) 1 gallon water, 3 pints 95% glycerine solution, or (c) 1 gallon water, 2½ pints 95% ethylene glycol.

For protection at +10° F. glycerine S. G. 1.090, or ethylene glycol S. G. 1.038 may be used. Where operating temperatures above the boiling point of water are required, glycerine may be used as the operating fluid.

Capacity and operating data relating to a heater devised according to this invention are, in one example:

Operating volume fluid per foot run_____cu. in__  90
Approximate weight of fluid_____lbs__  3.9
Operating temperature of fluid_____°F__  165
External surface of heater per foot run_____sq. ft__  3.6
Heat emission of heater per foot run_____B. t. u__  340
Electric rating of heater per foot run_____watts__  100

What we claim is:

1. An electric heater comprising at least one horizontally disposed externally longitudinally finned extruded hollow heat conductive metal tube, the interior surface of which defines a chamber and the fins thereof extending the entire length of said tube, said chamber being adapted to contain a heat conductive fluid, at least one sealed electric immersible heating element, and means on said tube for admitting and supporting said heating element longitudinally inside that part of said chamber which will be lower than the remainder of the chamber when said heater is in use.

2. An electric heater as claimed in claim 1 and end members sealing the opposite ends of said tube in fluid-tight fashion, at least one of said end members having said means for admitting and supporting said heating element therein.

3. An electric heater as claimed in claim 2 in which there is a single one of said hollow metal tubes and the end members each comprise a simple end plate having a charging inlet for the heat conductive fluid.

4. An electric heater as claimed in claim 2 in which there is a plurality of said hollow metal tubes and at least one of the end members comprises a hollow header body placing the interior of each of said hollow tubes in fluid communication with another of said hollow tubes, said header body having a charging inlet for the heat conductive fluid.

5. An electric heater as claimed in claim 2 in which there is a plurality of said tubes, the interiors of which define said chamber, said tubes being supported parallel to each other between said end members.

6. An electric heater as claimed in claim 2 in which there is a single one of said tube members having a cross-section which has an external shape of a generally flat rectangular panel.

7. An electric heater as claimed in claim 2 in which there is a single one of said tube members having a cross-section which has an external shape of a generally flat rectangular panel, and said at least one heating element arranged along the chamber interior closer to one long edge thereof than to the parallel opposite long edge thereof.

8. An electric heater as claimed in claim 2 in which there is a plurality of said tubes, the interiors of which define said chamber, said tubes being supported parallel to each other between said end members, and said at least one heating element being arranged along the interior of that one of said tubes which will be lower than the others when said heater is in use.

9. An electric heater as claimed in claim 1, said at least one heating element being in the lower part of said chamber, and an immersion thermostat element in the upper part of said chamber, said thermostat element being connected to a current supply having a pre-set air-temperature control unit for the regulation of current to said immersion heating element.

10. An electric heater comprising at least one horizontally disposed externally longitudinally finned extruded hollow heat conductive metal tube, the interior surface of which defines a chamber, and the fins thereof extending the entire length of said tube, four of said fins being similar deep radial fins extending outwardly to the corners of an imaginary square concentric with the tube, and the remaining fins on said tube being similar shallow fins alternating evenly with the deeper fins and extending only to the sides of said square, said chamber being adapted to contain a heat conductive fluid, at least one sealed electric immersible heating element, and means on said tube for admitting and supporting said heating element longitudinally in that part of said chamber which will be lower than the remainder of the chamber when the device is in use.

11. An electric heater comprising at least one horizontally disposed heat conductive metal tube, said tube comprising a pair of extruded identical deep trough U-section thin-walled externally longitudinally finned bodies joined together at the free edges of their side walls in continuous marginal flange surfaces and sealed in fluid-tight joints to form a single hollow metal body of a generally flat panel form, the interior surface of said hollow metal body defining a chamber adapted to contain a heat conductive fluid, at least one sealed electric immersible heating element, and end plates sealed to said hollow body having means therein for admitting and supporting said heating element longitudinally in that part of said chamber which will be lower than the remainder of the chamber when the device is in use.

References Cited in the file of this patent

UNITED STATES PATENTS

| | | |
|---|---|---|
| 1,919,204 | Decker | July 25, 1933 |
| 2,000,438 | Dougherty | May 7, 1935 |
| 2,051,485 | Katten | Aug. 18, 1936 |
| 2,060,795 | Burke | Nov. 17, 1936 |
| 2,109,279 | Soverhill | Feb. 22, 1938 |
| 2,225,850 | Wright | Dec. 24, 1940 |
| 2,455,839 | Walton | Dec. 7, 1948 |